July 6, 1943. G. W. PORTER ET AL 2,323,623
APPARATUS FOR FRYING POULTRY, FISH, OR OTHER MEAT PRODUCTS
Filed July 23, 1941

GEORGE W. PORTER
BENJAMEN F. KREHBIEL
INVENTORS.
BY U. G. Charles
atty.

Patented July 6, 1943

2,323,623

UNITED STATES PATENT OFFICE 2,323,623

APPARATUS FOR FRYING POULTRY, FISH, OR OTHER MEAT PRODUCTS

George W. Porter, Kansas City, Mo., and Benjamen F. Krehbiel, Wichita, Kans.

Application July 23, 1941, Serial No. 403,694

1 Claim. (Cl. 53—21)

Our invention relates to an apparatus for frying poultry, fish, or other meat product, and has for its principal object the possibility of frying such product in its natural embodiment of fat and liquid contained therein, and may be otherwise seasoned, the meat being concealed in a grease tight flexible container, the container, together with its contents, being submerged in hot grease of the frying temperature, whereby the meat product is sealed from fumes contrary to the substance being fried.

A further object of this invention is to fry the meat substance in a collapsible container, the body of the container being impervious to hot grease and being air tight with respect to the wall of its body, said container body having a mouth and means to secure the mouth and at the stitching grease tight but free to exhaust under pressure through the stitching to avoid explosion while the meat product is being fried in hot grease in which the container with its contents is submerged, and the inflated condition being means to exclude external injection until the container is removed from the grease.

A still further object of this invention is to provide a flexible sanitary container in which to place unminced but disjointed poultry, fish, or other meat product.

A still further object of this invention is to provide a container as an article of manufacture that may be furnished to the packing company so that the product to be fried will be placed in the container by the packing company and sealed as a feature of sanitation, preferably to delivering the same to the retail merchant or direct to the consumer, the latter to carry out the process of frying and eliminating further inspection or exposure of the product prior to frying the same.

These and other objects will hereinafter be more fully explained, reference being had to the accompanying drawing forming a part of this specification, and in which like characters will apply to like parts in the different views.

Referring to the drawing.

The invention herein disclosed consists in an apparatus for frying poultry, fish, or other meat product by excluding the same from contact with the frying substance to avoid contamination thereof with the substance being fried, and furthermore to preserve the natural substance contained in the meat product from exhausting therefrom by evaporation, or the like, and prohibit deterioration of its natural existing food values, as well as to preserve the wholesome flavor of such product, which otherwise would be altered under the common open process of frying, in which instance, grease is commonly applied directly and in quantity sufficient to at least partially submerge the product as optionally prepared. In other words, by the use of our apparatus the unminced meat product may undergo its cooking process without disjoining (as in the case of chicken) or severing the bulk of the substance. However, in the case of chicken the same is preferably disjointed similar to that illustrated in Fig. 2.

Figure 2:
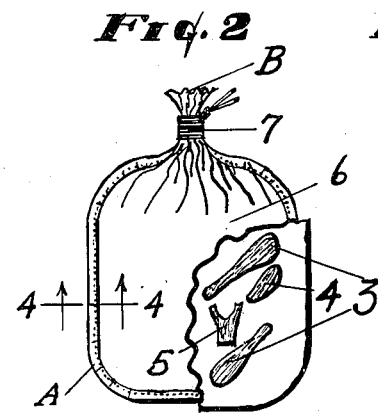
Fig. 2 is a side view of the container illustrating parts of dressed poultry contained therein by removing a portion of the container, said view also illustrating one method of closing its mouth.
Figure 3:
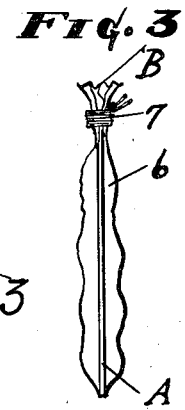
Fig. 3 is an edge or transverse view to that illustrated in Fig. 2.
Figure 4:
Fig. 4 is an enlarged sectional view taken on line 4—4 in Fig. 2, to illustrate the seam along the marginal contour of the container.
Figure 5:
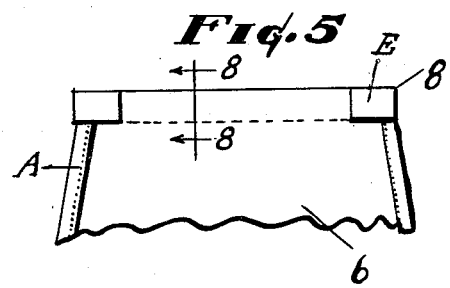
Fig. 5 is an enlarged side view at the mouth of the container illustrating another method of closing the mouth grease tight.
Figure 6:
Fig. 6 is a perspective view of a metallic clasp looking inward of its fold.

As a more concise description, it will be seen that the apparatus arrangement is positioned in a kitchen utensil 1 as a container for grease 2 as symbolized in Fig. 1 and heated to a high degree of temperature for the purpose hereinafter fully explained. For example, poultry such as chicken or turkey is disjointed by severing the body optionally, a portion of which is illustrated in Fig. 2, namely legs 3, thigh 4, and a breast portion 5, and other parts of the poultry not illustrated in the drawing, all of which is placed in a flexible container 6 that is grease tight and is marginally stitched together as at A, the marginal portion being lapped back on itself as shown in Fig. 4 at the contour of the container body, while the upper or end portion thereof is open and through which the container is appropriately filled with its contents to be fried. The preferred number of pieces are distributed in close relation over one side of the container, the sides of which are pressed toward each other to close engagement with the contents, whereby the container, being collapsed, is practically void of air, after which the mouth is sealed grease tight, one method of which may be by contracting the mouth as shown in Figs. 2 and 3 as at B and wrapped tightly by a cord 7 appropriately tied for reopening.

Figure 7:
Fig. 7 is a top or plan view at the mouth illustrated in Fig. 5.
Figure 8:
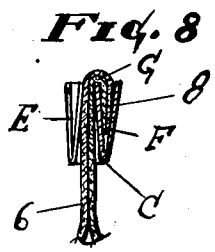
Fig. 8 is an enlarged sectional view at the mouth taken on line 8—8 in Fig. 5.

Another method is to place a marginal portion of the container at its opening by pressing the sides thereof to close engagement and inserting thereover the legs of a metallic clasp 8 that is formed by a centrally disposed bend C longitudinally of the strip to lap the same together and being compressed to snug engagement to bind the mouth in a closed position, after which the strip is rolled to lap the mouth back on itself as shown in Fig. 8, after which the outward extension of each end of the strip as shown by dotted lines D are bent back to the same side and toward each other as at E shown in Fig. 7, by which means the mouth is retained against unwinding and made grease tight by snug engagement at the outer extremity of the mouth as at F, and also the sides of the mouth inward therefrom being secured together where it bends over the edge of one side of the metallic strip as at G.

It will now be seen that the mouth is sealed grease tight and the strip easily and readily removed by straightening, or partially so, its lapped ends. Attention is also directed that the metallic strip straddling the mouth may be turned for a plurality of winds if so desired, while, at the same time, if the container becomes inflated excessively during the frying process, the inflated condition may exhaust through the stitching A of the seams, it being understood that the inflated condition will continue during the frying process. Therefore, injection of grease through the stitching would be impossible, as contraction of the container may take place after its withdrawal from the hot grease, and furthermore contraction does not set up a vacuum as the walls of the container are free to flex inward. Therefore, as above stated, injection through the stitching is impossible.

Figure 1:
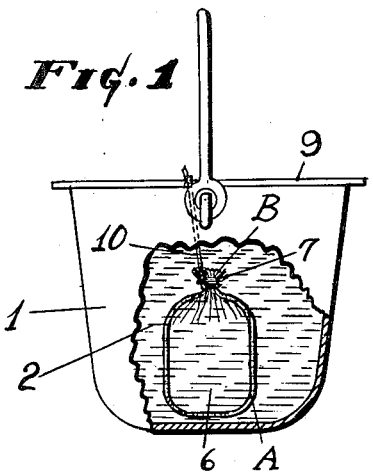
Fig. 1 represents a suitable cooking utensil showing our container submerged in hot grease, parts removed for convenience of illustration.

In Fig. 1 is illustrated a simple and efficient way of supporting the poultry container, which is accomplished through the medium of a rod 9 diametrically crossing the top of the utensil, and being carried thereby, and to which a cord 10, or the like, is attached, said cord being secured in an appropriate way to the container, whereby the same may be centrally positioned in the grease, and from contact with the utensil. Other means, however, may be provided to accomplish the same result.

The flexible container above referred to is made from an appropriate flexible sheet of material as by tight woven fabric of a textile nature or by a pulp substance, so long as the walls of the container are grease tight and strong in texture to avoid fracture, and other means aside from that illustrated may be employed to close the opening grease tight, and such other modifications may be made as lie within the scope of the appended claim.

Having fully described our invention what we claim as new and desire to secure by Letters Patent is:

In a flexible grease tight container of the class described, the container comprised of two side members, substantially rectangular in form whereby sides, bottom and top edges are provided, the top edge being open while a marginal portion of the sides and bottom are lapped back on themselves and being stitched together as a grease tight enclosure, the closing means for the top consisting of a metal strip to lie on the outer side, a portion of each end of the strip extending outward from the container while one edge of the strip is flush with the outer extremity of the container at its open end and being rolled for lapped engagement of the flexible material and secured by bending said end portions of the metal strip inward toward each other to snugly engage on the other side of the container to avoid unrolling during the process of frying meat contained therein, and the stitching to function as an exit for steam rising from the meat while cooking, the stitching apertures being normally closed against injection of grease but free as an exit for the steam under the force of inflation.

GEORGE W. PORTER.
BENJAMEN F. KREHBIEL.